United States Patent
Dannebro et al.

(10) Patent No.: US 11,419,035 B2
(45) Date of Patent: Aug. 16, 2022

(54) METHOD AND FUNCTION FOR HANDLING TRAFFIC FOR AN APPLICATION

(71) Applicant: Telefonaktiebolaget LM Ericsson (publ), Stockholm (SE)

(72) Inventors: Patrik Dannebro, Hisings Kärra (SE); Roland Gustafsson, Bengtsfors (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 12 days.

(21) Appl. No.: 16/756,495

(22) PCT Filed: Nov. 21, 2017

(86) PCT No.: PCT/EP2017/079909
§ 371 (c)(1),
(2) Date: Apr. 16, 2020

(87) PCT Pub. No.: WO2019/101292
PCT Pub. Date: May 31, 2019

(65) Prior Publication Data
US 2021/0099943 A1   Apr. 1, 2021

(51) Int. Cl.
*H04W 40/20* (2009.01)
*H04W 76/11* (2018.01)
*H04W 28/08* (2009.01)
*H04M 15/00* (2006.01)

(52) U.S. Cl.
CPC .......... *H04W 40/20* (2013.01); *H04M 15/66* (2013.01); *H04W 28/0808* (2020.05); *H04W 76/11* (2018.02)

(58) Field of Classification Search
None
See application file for complete search history.

(56) References Cited

U.S. PATENT DOCUMENTS

| 2003/0193910 A1 | 10/2003 | Shoaib et al. |
| 2012/0314688 A1 | 12/2012 | Taleb et al. |
| (Continued) | | |

FOREIGN PATENT DOCUMENTS

| CN | 101674323 A | 3/2010 |
| CN | 102185723 A | 9/2011 |
| (Continued) | | |

OTHER PUBLICATIONS

Lai, W. et al., "Dual Migration for Improved Efficiency in Cloud Service", ACIIDS 2012: Intelligent Information and Database Systems, vol. 7198, Jan. 1, 2012, pp. 216-225, Springer.
(Continued)

*Primary Examiner* — Mohammad S Adhami
(74) *Attorney, Agent, or Firm* — Coats + Bennett, PLLC

(57) ABSTRACT

The embodiments herein relate to a method performed by a SMF (108) for handling traffic for an application (201). The SMF (108) receives, from an AF (135), a plurality of candidate locations (200a, 200b) for the application (201) and traffic routing information for the application (201) for each of the plurality of locations (200a, 200b). The SMF (108) determines that the SMF (108) is allowed to steer traffic for the application (201) to a selected one of the plurality of locations. The SMF (108) selects one of the candidate locations (200a, 200b) among the plurality (200a, 200b) received from the AF (135), and steers the traffic for the application (201) to the selected candidate location (200a, 200b).

16 Claims, 10 Drawing Sheets

(56) References Cited

U.S. PATENT DOCUMENTS

| | | | |
|---|---|---|---|
| 2017/0317894 A1 | 11/2017 | Dao et al. | |
| 2018/0192390 A1* | 7/2018 | Li | H04W 4/50 |
| 2018/0263039 A1* | 9/2018 | Fang | H04W 72/0493 |
| 2019/0007500 A1* | 1/2019 | Kim | H04L 67/141 |
| 2019/0158408 A1* | 5/2019 | Li | H04L 67/104 |
| 2019/0306766 A1* | 10/2019 | Ketyko | H04L 41/16 |

FOREIGN PATENT DOCUMENTS

| | | |
|---|---|---|
| CN | 102763456 A | 10/2012 |
| CN | 107332877 A | 11/2017 |

OTHER PUBLICATIONS

3rd Generation Partnership Project, "3rd Generation Partnership Project; Technical Specification Group Services and System Aspects; Procedures for the 5G System; Stage 2 (Release 15)", Technical Specification, 3GPP TS 23.502 V1.3.0, Nov. 1, 2017, pp. 1-215, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.5.0, Nov. 1, 2017, pp. 1-170, 3GPP.

"Presentation of TR 23.501: System Architecture for the 5G System (Release 15) to TSG SA for Approval", 3GPP TSG SA Meeting #76, West Palm Beach, USA, Jun. 7, 2017, pp. 1-2, SP-170384, 3GPP.

"TS 23.501: System Architecture for the 5G System for information", 3GPP TSG SA Meeting #77, Sapporo, Japan, Sep. 13, 2017, pp. 1-2, SP-170736, 3GPP.

Roozbeh, A., "Distributed cloud and de-centralized control plane: A proposal for scalable control plane or 5G", 2015 IEEE/ACM 8th International Conference on Utility and Cloud Computing, Dec. 7, 2015, pp. 348-353, IEEE.

* cited by examiner

METHOD AND FUNCTION FOR HANDLING TRAFFIC FOR AN APPLICATION

TECHNICAL FIELD

Embodiments herein relate generally to a Session Management Function (SMF) and a method performed by the SMF. More particularly the embodiments herein relate to for handling traffic for an application (APP).

BACKGROUND

According to 3GPP TS 23.501 V1.5.0 (2017 November), the "5G System architecture is defined to support data connectivity and services enabling deployments to use techniques such as e.g. Network Function Virtualization and Software Defined Networking. The 5G System architecture shall leverage service-based interactions between Control Plane (CP) Network Functions where identified." 5G is short for Fifth Generation.

FIG. 1 illustrates an exemplary architecture for a non-roaming 5G System Architecture for concurrent access to two data networks, single Protocol Data Unit (PDU) session option, in a reference point representation". In general, a 5G system comprises a 5G Access Network (AN), a 5G Core Network (CN and UE. In more detail, FIG. 1 illustrates a UE 101 that is connected to a (Radio) Access Network ((R)AN) 103. The (R)AN 103 is connected to an Access and Mobility Management Function (AMF) 105 via a N2 reference point. The UE 101 is connected to the AMF 105 via a N1 reference point. The AMF 105 is adapted to be connected to an SMF 108 via a N11 reference point. The SMF 108 is adapted to be connected to two User plane Functions (UPF) 125 via a respective N4 reference point. The (R)AN 103 is adapted to be connected one of the UPFs 125 via a N3 reference point. The two UPFs 125 are adapted to be connected to each other via a N9 reference point. Each UPFs 125 is adapted to be connected to a respective DN 120 via respective N6 reference point. The DN may be e.g. operator services, Internet access or 3rd party services. The AMF 105 is adapted to be connected to an Authentication Server Function (AUSF) 128 via a N12 reference point. The AMF 105 is adapted to be connected to a Network Slice Selection Function (NSSF) 129 via a N22 reference point. The AMF 105 is adapted to be connected to a Unified Data Management (UDM) 130 via a N8 reference point. The AUSF 128 is adapted to be connected to the UDM 130 via the N13 reference point. The SMF 108 is adapted to be connected to the UDM 130 via a N10 reference point. The SMF 108 is adapted to be connected to a Policy Control function (PCF) 133 via a N7 reference point. The PCF 133 is adapted to be connected to an Application Function (AF) 135 via a N5 reference point. The PCF 133 is adapted to be connected to the AMF 105 via a N15 reference point. A reference point may also be referred to as an interface.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server. 3GPP TR 21.905 V14.1.1 (2017 June) defines the UE 101 as follows: "Allows a user access to network services. For the purpose of 3GPP specifications the interface between the UE and the network is the radio interface. A User Equipment can be subdivided into a number of domains, the domains being separated by reference points. Currently the User Equipment is subdivided into the UICC domain and the ME Domain. The ME Domain can further be subdivided into one or more Mobile Termination (MT) and Terminal Equipment (TE) components showing the connectivity between multiple functional groups."

The (R)AN 103 may comprise a RAN node (not shown in FIG. 1) such as a base station, a NodeB, an eNodeB, gNB Next Generation-RAN (NG-RAN) or any other network unit capable to communicate over a radio carrier with the UE 101. The abbreviations (R)AN and RAN may be used interchangeably herein when referring to an access network, a radio access network, a node comprised in the access network and a node comprised in the radio access network.

It should be noted that the communication links in the system illustrated in FIG. 1 may be of any suitable kind including either a wired or wireless link. The link may use any suitable protocol depending on type and level of layer, e.g. as indicated by the Open Systems Interconnection (OSI) model, as understood by the person skilled in the art.

Edge computing is a feature which enables operator and 3rd party services to be hosted close to a UEs 101 access point of attachment. Close may refer to geographically close to achieve e.g. low latency. The purpose of edge computing is to achieve an efficient service delivery through the reduced end-to-end latency and load on the transport network. Support for edge computing is defined in 3GPP TS 23.501 3GPP TS 23.501 V1.5.0 (2017 November), chapter 5.13. This chapter describes that the 5G Core Network (CN) selects a UPF 125 close to the UE 101 and executes the traffic steering from the UPF 125 to the local DN 120 via a N6 interface. The N6 interface is an interface between the DN 120 and the UPF 125. There are a number of Third Generation Partnership Project (3GPP) functions that may be required, for example that the AF 135 influences the traffic steering.

The AF 135 can influence the selection of the UPF 125. The traffic shall be steered in a certain way to reach an Application (APP) location. The information, e.g. in the form of AF rules, can be sent from the AF 135 to the PCF 133 to the SMF 108, or from the AF 135 via a Network Exposure Function (NEF) 205 to the PCF 133 and to the SMF 108. The information is expressed as a list of Data Network Access Identifier (DNAI) and associated N6 traffic routing information where the DNAI describes the location of the APP, and where N6 traffic routing information describe how traffic shall be steered from the UPF 125 to reach the APP in a distributed datacenter, i.e. the edge.

The SMF 108 may insert and configure a new UPF 125 in the data path used for local breakout, and update the UPF 125 with traffic routing rules. If the SMF 108 reselects an UPF 125, it may send a notification to the AF 135 to report of the new location, e.g. represented by the DNAI. Reselecting may also be referred to as changing traffic information.

The SMF 108 may freely relocate the UPF 125, or limited by some configurational constraints. The UPF relocation means a change of DNAI for the UPF 125. A new UPF location can always continue to steer traffic to the "old" APP at the old location, e.g. the DNAI associated with the APP provided by the AF 135. This is done by applying the "old" traffic steering information in the new UPF location. A new UPF location is typically selected due to that the UE 101 moves to another area and thus needs a local breakout that is "more local". To take full advantage of UPF relocation, the traffic routing information should be updated for the "new" UPF 125 to steer to an APP that also is "more local", i.e. relocate the APP. However, changing the traffic routing information freely is not suitable if the APP is stateful.

When an APP is stateful it may refer to that it maintains or is dependent on the previous state of an APP process, or that it supports different states, i.e. it reacts to the same input differently depending on the current state. When an APP is stateless, which is contrasted to stateful, the APP procedure is not dependent on the previous state. In other words, it does not keep a persistent state between transaction and treats each requests independently.

A relocation of traffic routing information leads to end user impact as the traffic may be interrupted due to e.g. a restart of APP session. The 3GPP has discussed relocation scenarios where the SMF 108 may ask the AF 135 for permission before relocation of traffic routing information. Such permission is not feasible since it will delay execution of relocation. Another alternative is that the SMF 108 relocates the UPF 125, sends a notification to the AF 135, and then awaits a new DNAI and traffic routing information from the AF 135. This new DNAI and traffic routing information is then used to steer the traffic from the UPF 125 to a new APP location, hopefully closer to the UPF 125. This needs another round of acknowledgement before the SMF 108 actually removes the old UPF 125 with the old traffic routing information and the user plane path is finally optimized for low latency.

Therefore, there is a need to at least mitigate or solve this issue.

SUMMARY

An objective of embodiments herein is therefore to obviate at least one of the above disadvantages and to provide improved handling of traffic for an application.

According to a first aspect, the object is achieved by a performed by the SMF for handling traffic for an application. The SMF receives, from an AF, a plurality of candidate locations for the application and traffic routing information for the application for each of the plurality of locations. The SMF determines that the SMF is allowed to steer traffic for the application to a selected one of the plurality of locations. The SMF selects one of the candidate locations among the plurality received from the AF, and steers the traffic for the application to the selected candidate location.

According to a second aspect, the object is achieved by a SMF for handling traffic for an application. The SMF is adapted to receive, from an AF, a plurality of candidate locations for the application and traffic routing information for the application for each of the plurality of locations. The SMF is adapted to determine that the SMF is allowed to steer traffic for the application to a selected one of the plurality of locations. The SMF is adapted to select one of the candidate locations among the plurality received from the AF, and to steer the traffic for the application to the selected candidate location.

Since the SMF is allowed to select one of the plurality of candidate locations and steer the traffic to this selected location, the handling of traffic for the application is improved in that the traffic is steered to the most appropriate location.

Embodiments herein afford many advantages, of which a non-exhaustive list of examples follows:

One advantage of the embodiments herein is that they speed up the steering of traffic to and from APPs by allowing the SMF to change the traffic routing information, improving end user experience by always and speedily selecting steering to the most appropriate APP location as expressed in the location information from the AF.

Another advantage is that they remove unnecessary signaling at the APP relocation as the SMF does not have to negotiate a change of traffic routing information to change of the APP location by the AF.

A further advantage of the embodiments herein is that they assist the SMF in cleaning up the user plane path as the SMF may remove unused UPFs with unused traffic routing information immediately after a traffic steering.

Another advantage of the embodiments herein is that they allow usage of legacy procedures for changing traffic routing information, i.e. APP relocation, if the APP is stateful.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The SMF 108 should be able to change, add and/or remove traffic routing information on a UPF 125 freely as long as the traffic routing information is among those given to it by the AF 133. In other words, the SMF 108 is allowed to steer traffic for an APP to a selected location. The selected location is amongst a plurality of candidate location which the SMF 108 has received information about from the AF 133. Thus, routing of traffic to a selected candidate location may be associated with changing, adding and/or removing traffic routing information.

Figure 2:
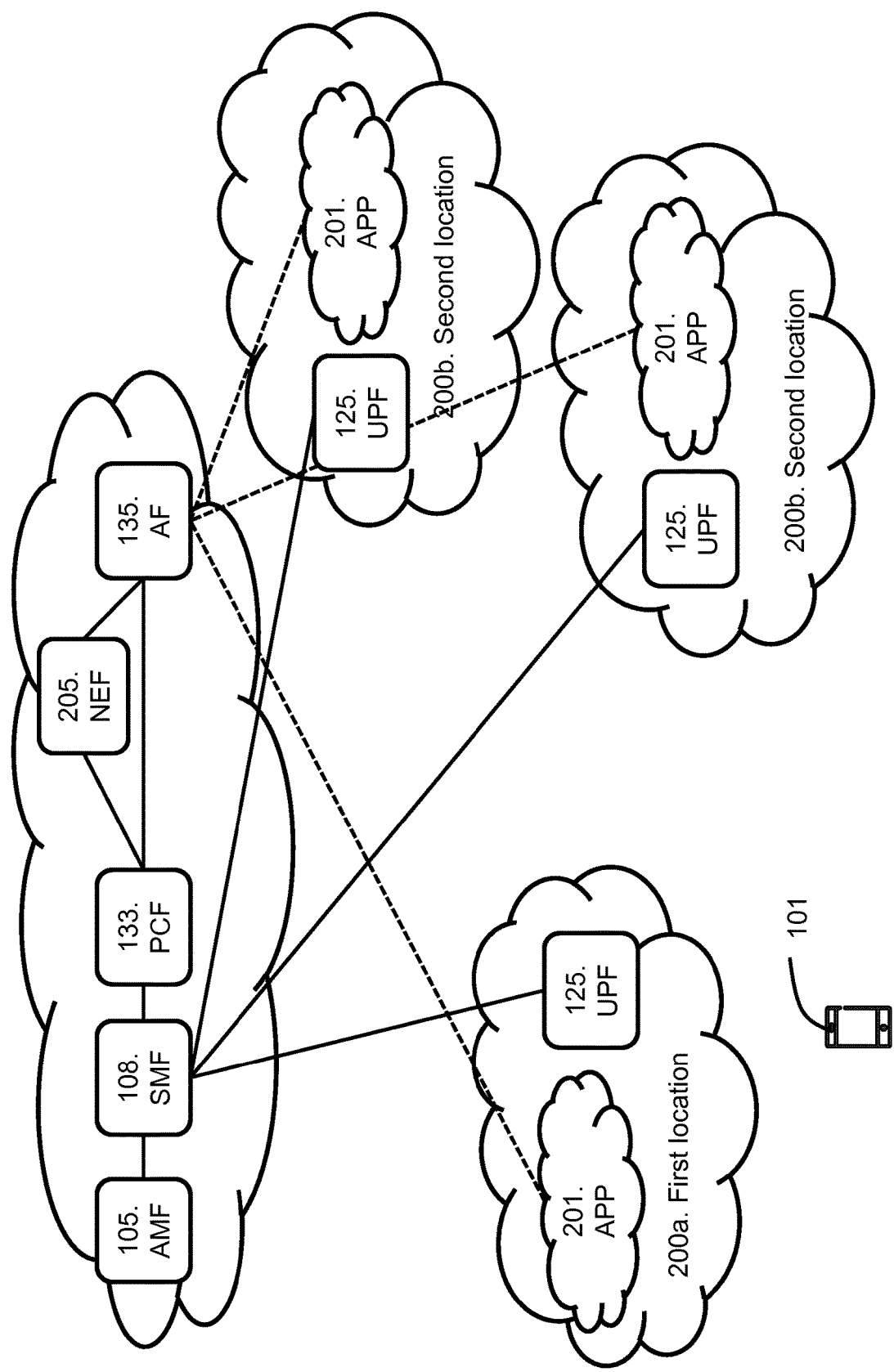
FIG. 2 is a schematic block diagram illustrating an example of a 5G system.

FIG. 2 illustrates an example of a 5G system in which embodiments herein may be implemented. The 5G system comprises a plurality of locations. The term plurality is used herein when referring to an integer number which is greater than one, i.e. from two and upwards. In FIG. 2, an example with a first location 200a and two second locations 200b are illustrated. However, any other number of first and second locations 200a, 200b is applicable. When the reference number 200 is used herein without the letters a, b, it refers to any of the first and second locations 200a, 200b. A location 200 may also be referred to as a DN 120. Each location 200a, 200b is served by one or more (R)ANs 103 (not illustrated in FIG. 2) which are adapted to communicate with a UE 101.

One or more APPs 201 are deployed in each of the locations 200a, 200b. Only one APP 201 is shown in each location 200a, 200b in FIG. 2 for the sake of simplicity.

The APP 201 may be an end user application running in the cloud or DN 120. The APP 201 may also be described as the server that is running in a distributed or local cloud or datacenter which we corresponds to a location 200a, 200b herein. Typically the application on the cell phone communicates with the APP 201 (server) in the cloud. Example could be Pokemon Go application on the phone that is broken out to a local Pokemon Go server (here APP 201) that can send data with low latency for an enriched Augmented Reality experience.

Each of the first and second locations 200a, 200b comprises a respective UPF 125. The UPF 125 may be referred to as a function, an entity, a function implemented in an entity etc. The UPF 125 may have at least one of the following functionalities:

- Anchor point for Intra-/Inter-Radio Access Technology (RAT (mobility, when applicable.
- External PDU Session point of interconnect to DN.
- Packet routing & forwarding.
- Packet inspection and User plane part of Policy rule enforcement.
- Lawful intercept, UP collection.
- Traffic usage reporting.
- Uplink classifier to support routing traffic flows to a DN.
- Branching point to support multi-homed PDU Session.
- Quality of Service (QoS) handling for user plane, e.g. packet filtering, gating, uplink/downlink (UL/DL) rate enforcement.
- UL traffic verification, e.g. SDF to QoS Flow mapping.
- Transport level packet marking in the UL and DL.
- DL packet buffering and DL data notification triggering.
- Sending and forwarding of one or more "end marker" to the source NG-RAN node.
- Allocation and Retention Priority (ARP) proxying and/or Internet Protocol version 6 (IPv6) Neighbour Solicitation Proxying.

The location 200a, 200b may be identified with an identity such as e.g. a DNAI. DNAI is defined by the 3GPP TS 23.501 V1.5.0 (2017 November) as an "Identifier of a user plane access to one or more DN(s) where applications are deployed".

In one example, the UE 101 does not have any ongoing PDU sessions in order to transmit and receive traffic to and from an APP 201 in any of the locations 200a, 200b. The SMF 108 may in such example initially select a location 200a, 200b to which the traffic should be steered. In such scenario, there is no relocation of traffic, but the traffic is steered or steered to a location.

In another example, the UE 101 may have an ongoing session anchored in the UPF 125 in the first location 200a so that the UE 101 can transmit and receive data traffic to and from the APP 201 in the first location 200a. The session may be a PDU session. At a later point of time, the traffic to and from the APP 201 is steered or relocated to be towards another instance of the APP 201 which is in the second location 200b so that the UE 101 has a session anchored in the UPF 125 in the second location 200b instead. The traffic may be said to be relocated in this example because it was previously to another location 200a. This will be described in more detail later.

FIG. 2 also shows the AMF 105, the SMF 108, the PCF 133, a NEF 205 and an AF 135. The cloud around these entities may illustrate that they are located at the same location. The SMF may be a distributed unit or a single unit.

As mentioned above, one or more APPs 201 are deployed in each of the first and second locations 200a, 200b. In this example, the APP 201 in the first location 200a and the APP 201 in the second locations 200b are the same, i.e. there are multiple instances of the same APP 201 in different locations.

The first and second locations 200a, 200b may be referred to as candidate locations 200a, 200b because they are candidates for locations to which the UE 101 can be associated. One of these candidate locations is selected to which the UE 101 should be associated. For example, initially, when the UE 101 does not have any existing sessions with any of the APPs 201, the first location 200a may be selected as the candidate location towards which the traffic between the UE 101 and the APP 201 in the first location 200a should be conveyed, i.e. there is an initial selection of location 200. At a later point of time, when the UE 101 already has a session with the APP 201 in the first location 200a, one of the second locations 200b can be selected as the candidate location 200a, 200b to which the UE's traffic to and from the APP 201 should be relocated, i.e. there is a reselection of location 200 in this example.

Different terms may be used when referring to the first and second locations 200a, 200b, and some examples are shown in Table 1 below:

TABLE 1

| First location 200a | Second location 200b |
|---|---|
| Candidate location | Candidate location |
| Initial location | Subsequent location |
| Current location | New location |
| Central location | Local location |
| Source location | Target location |

As mentioned above, both the first location 200a and the second location 200b comprise a respective UPF 125. These UPFs 125 may be referred to as UPFs in general, but other names may also be applicable.

Table 2 shows some examples of the names of the UPFs 125:

TABLE 2

| UPF in first location 200a | UPF in second location 200b |
|---|---|
| First UPF | Second UPF |
| Candidate UPF | Candidate UPF |
| Initial UPF | Subsequent UPF |

TABLE 2-continued

| UPF in first location 200a | UPF in second location 200b |
|---|---|
| Current UPF | New UPF |
| Central UPF | Local UPF |
| Source UPF | Target UPF |
| UPF Branching Point (BP) | UPF PDU Session Anchor (UPF PSA) |

The SMF 108 is illustrated to be adapted to communicate with each of the UPFs in the first and second locations 200a, 200b.

The AF 135 is adapted to obtain information regarding the APP 201, and this is illustrated with the dotted lines in FIG. 2. Such information may be for example whether the APP 201 is stateful or stateless.

Figure 1:
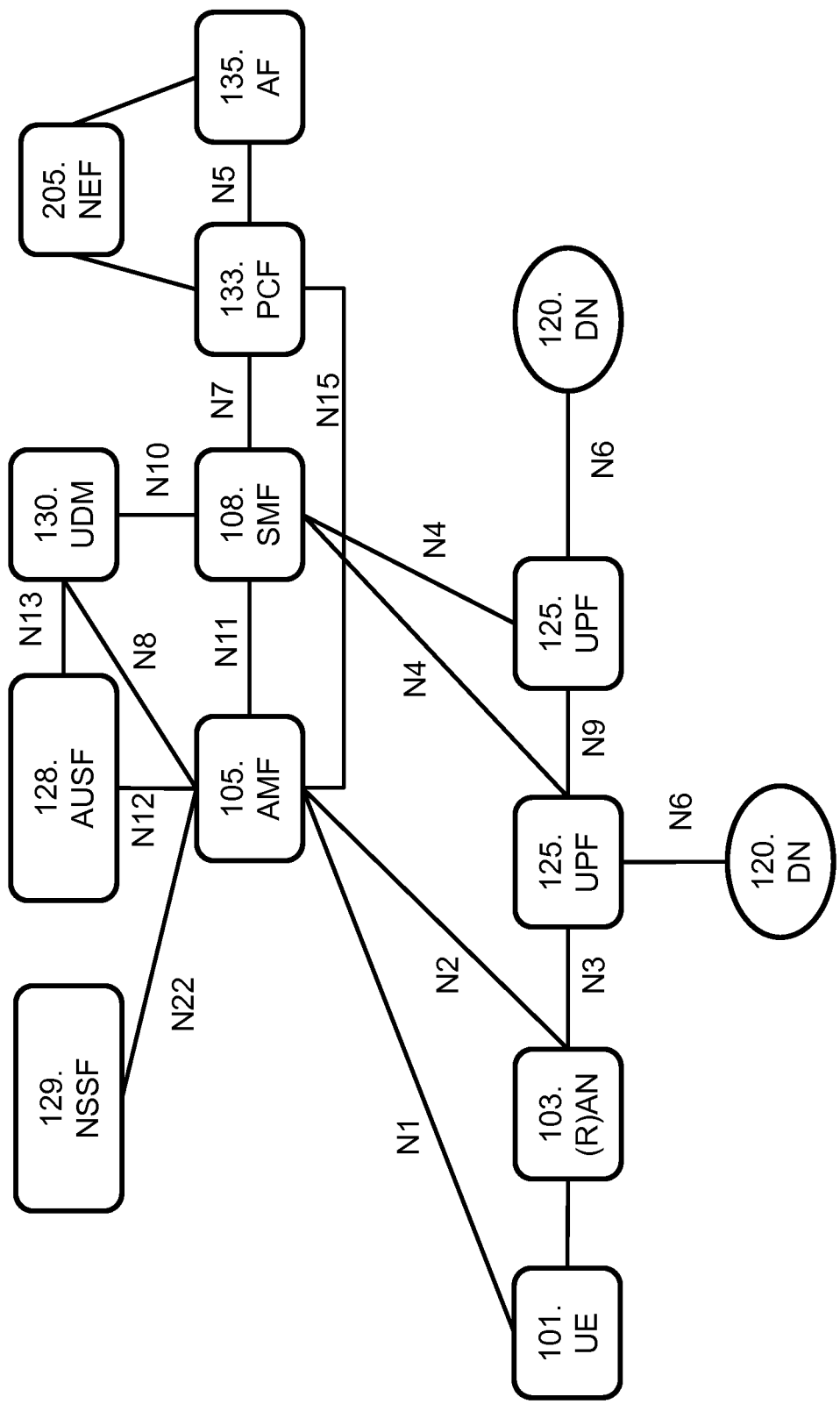
FIG. 1 is a schematic block diagram illustrating an example of a 5G system.

Note that the system illustrated in FIG. 2 may comprise additional entities than the ones shown in FIG. 2, such as e.g. the entities shown in FIG. 1.

A general overview of a method according to the embodiments herein will first be described. More details will be provided later with reference to FIGS. 4-7.

Figure 3:
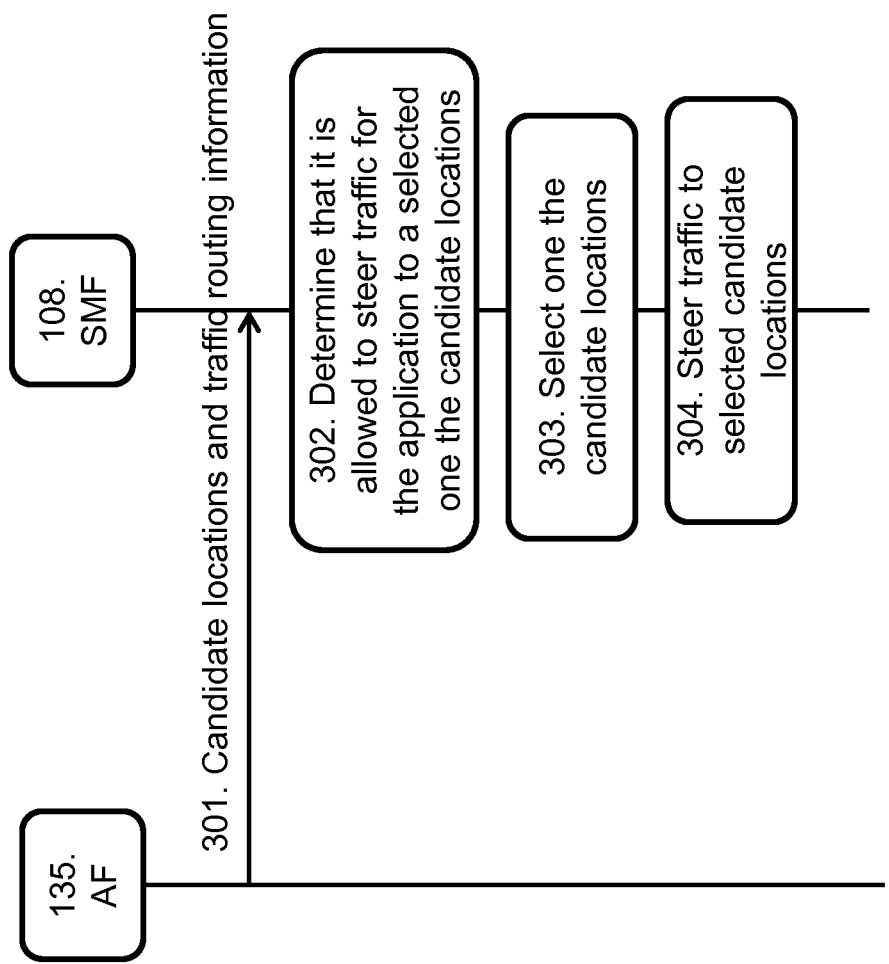
FIG. 3 is a signaling diagram illustrating an example method.

FIG. 3 is a signaling diagram illustrating an example method for handling traffic for an APP 201. The method comprises at least one of the following steps, which steps may be performed in any suitable order than described below:

Step 301

The AF 135 sends, to the SMF 108, a plurality of candidate locations 200a, 200b for the application 201 and traffic routing information for the application 201 for each of the plurality of locations 200a, 200b. In other words, each location 200a, 200b has a corresponding traffic routing information. The SMF 108 receives the information from the AF 135. The information may be sent directly to the SMF 108, or via one or more other entities.

Step 302

The SMF 108 determines that it is allowed to steer traffic for the application 201 to a selected one of the plurality of locations. This decision may be taken based on that the SMF 108 is per default allowed, that the SMF 108 has received an indication of that it is allowed, that it has not received any indication of that it is not allowed etc. The basis for the decision will be described in more detail later.

That the SMF 108 is allowed to steer traffic for the application 201 to a selected one of the plurality of locations may also be referred to as the SMF 108 has permission to select the traffic routing information since the traffic routing information indicates how to reach the APP 201 in a certain location 200a, 200b. Since a location 200a, 200b comprises an UPF 125, the selection of a candidate location 200a, 200b implicitly involves selectin of an UPF 125 from a plurality of candidate UPFs 125.

Step 303

The SMF 108 selects one of the candidate locations 200a, 200b among the plurality 200a, 200b received from the AF 135. The selected location 200a, 200b may be seen as the most appropriate location 200a, 200b. There may be different reasons for the selecting, such as geographical location, latency, transmission, load balancing, life cycle management of the network functions etc.

For example, if the UE 101 does not have any existing PDU session, the SMF 108 may select the first location 200a as the selected candidate location. In another example, if the UE 101 has ongoing PDU session associated with the first location 200a, the SMF 108 may select one of the second locations 200b as the selected candidate location. The selection may then be referred to as a reselection.

Step 304

The SMF 108 then steers the traffic for the application 201 to the selected candidate location 200a, 200b.

If the UE 101 had an ongoing PDU session associated with the first location 200a, and then the SMF 108 selected one of the second locations 200b, the steering of the traffic may be referred to as relocating the traffic from the first location 200a to the selected second location 200b

More details of the method illustrated in FIG. 3 will now be provided with reference to FIGS. 4-7.

Figure 4:
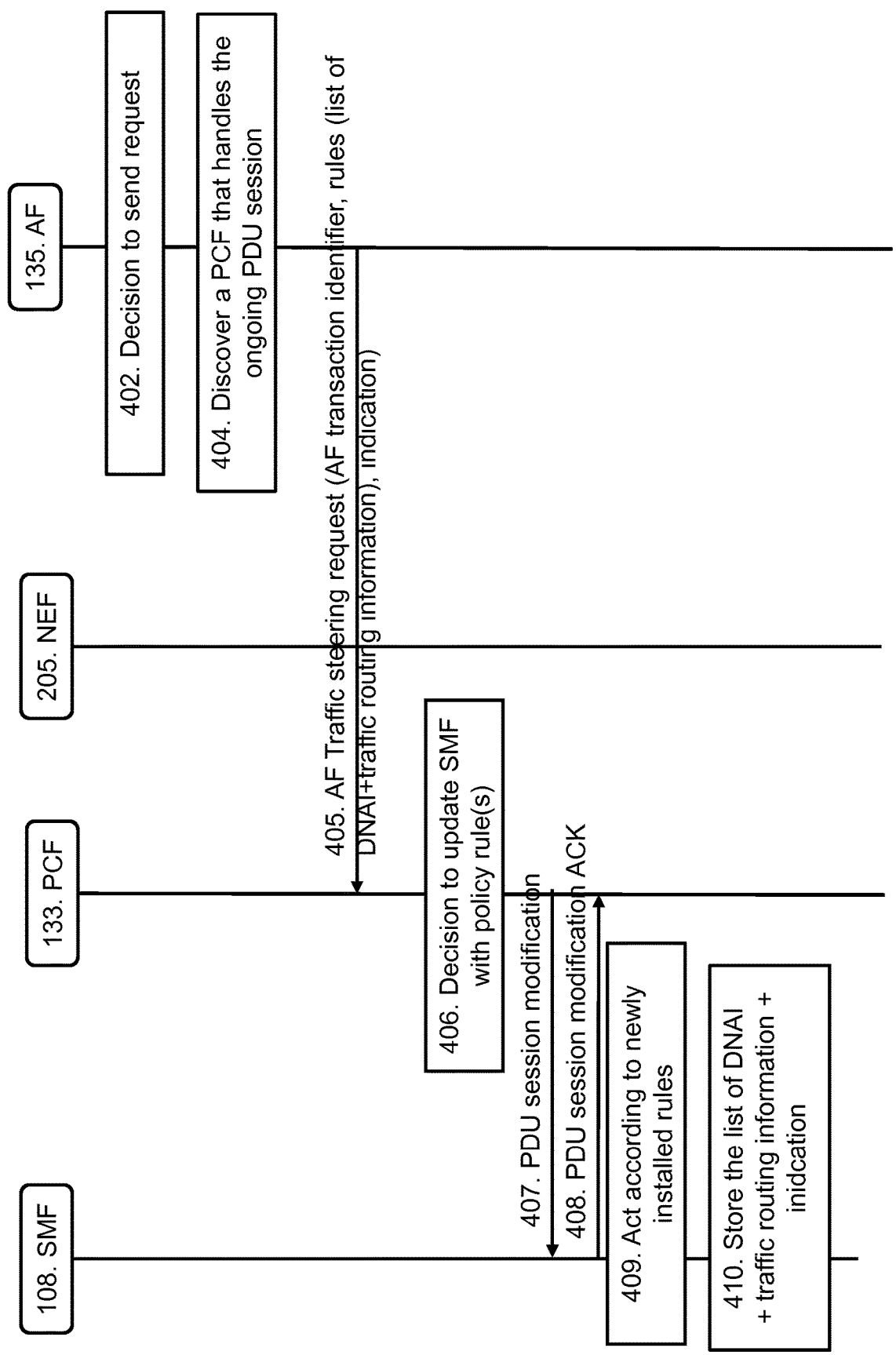
FIG. 4 is a signaling diagram illustrating an example method.
Figure 5:
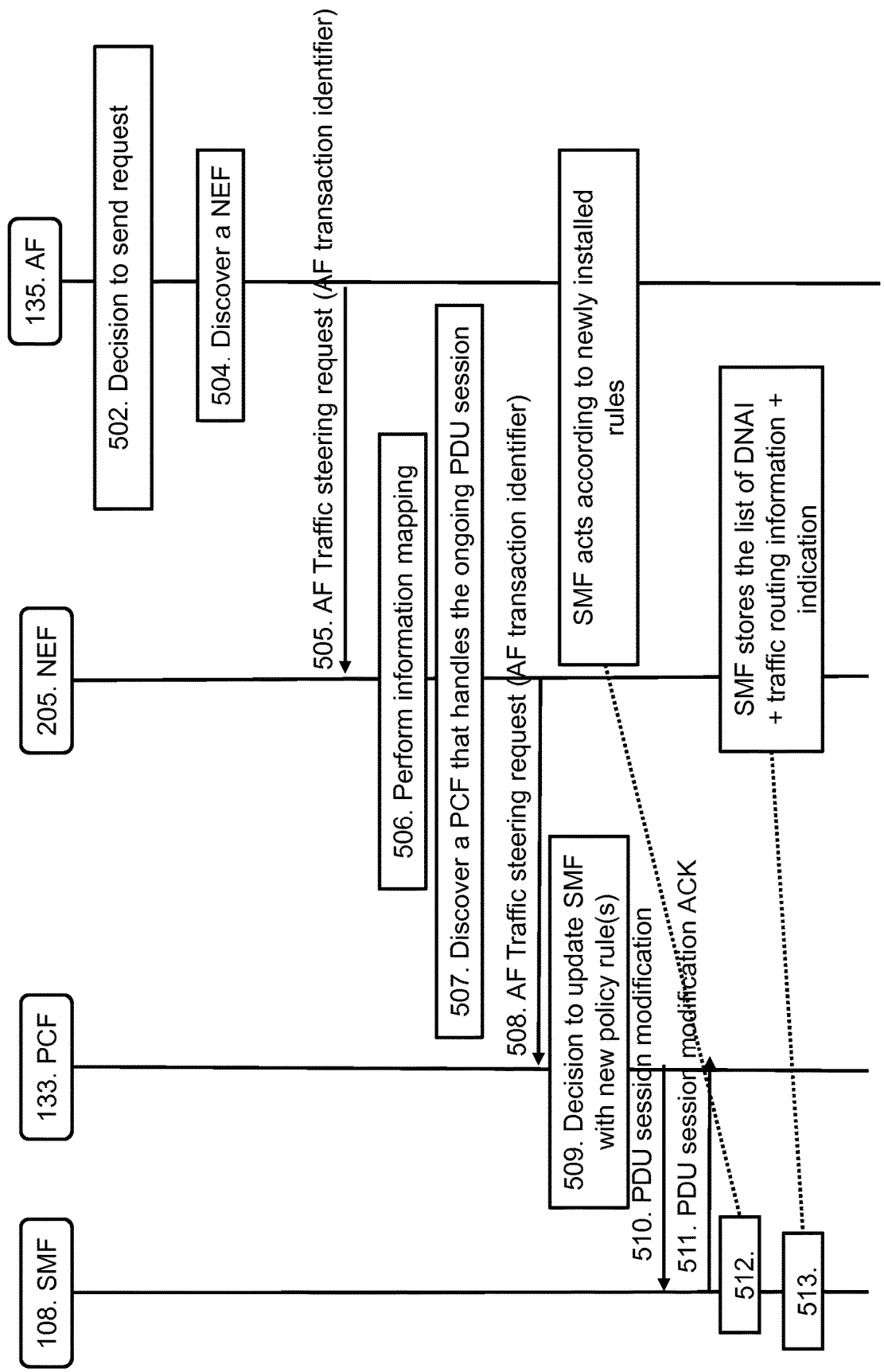
FIG. 5 is a signaling diagram illustrating an example method.

A method applying dynamic rules for a UE 101 with an ongoing PDU session will now be described with reference to FIGS. 4 and 5. FIG. 4 illustrate an example where a request message is transmitted directly from the AF 135 to the PCF 133. FIG. 5 illustrates an example where the request message is transmitted from the AF 135 via the NEF 205 to the PCF 133.

FIG. 4 is a signaling diagram illustrating an example of a method with dynamic rules for a UE 101 with an ongoing PDU session. The method comprises at least one of the following steps, which steps may be performed in any suitable order than described below:

Step 402

The AF 135 decides to send requests to influence SMF steering decisions for traffic of a PDU Session.

Step 404

The AF 135 discovers a PCF 133 that handles the ongoing PDU session.

Step 405

This step corresponds to step 301 in FIG. 3. The AF 135 sends a request message to the PCF 133. The message is sent directly from the AF 135 to the PCF 133. The PCF 133 receives the request message from the AF 135. The request message may be an AF Traffic steering request message. The request message comprises an AF transaction identifier. The request message further comprises candidate locations 200a, 200b of APPs 201 towards which the traffic steering should apply. The candidate location of the APP 201 is expressed in a list of DNAI(s) and information about the traffic routing information. In addition, the request message may include an indication or flag. The traffic routing information may be N6 traffic routing information.

Step 406

This step corresponds to step 301 in FIG. 3. Triggered by step 405, the PCF 133 takes a decision to update the SMF 108 with policy rule(s). More specifically the PCF 133 determines if existing PDU Sessions are impacted by the AF request. The policy rule comprises an indication of that the SMF 108 can freely selected between the locations 200a, 200b.

Step 407

This step corresponds to step 301 in FIG. 3. The PCF 133 sends a PDU session modification message to the SMF 108. The SMF 108 receives the message from the PCF 133. The Step 408

The SMF 108 sends a PDU session modification Acknowledgement (Ack) message to the PCF 133. The Ack message is an acknowledgement of the message in step 407. The PCF 133 receives the message from the SMF 108.

Step 409

Figure 6:
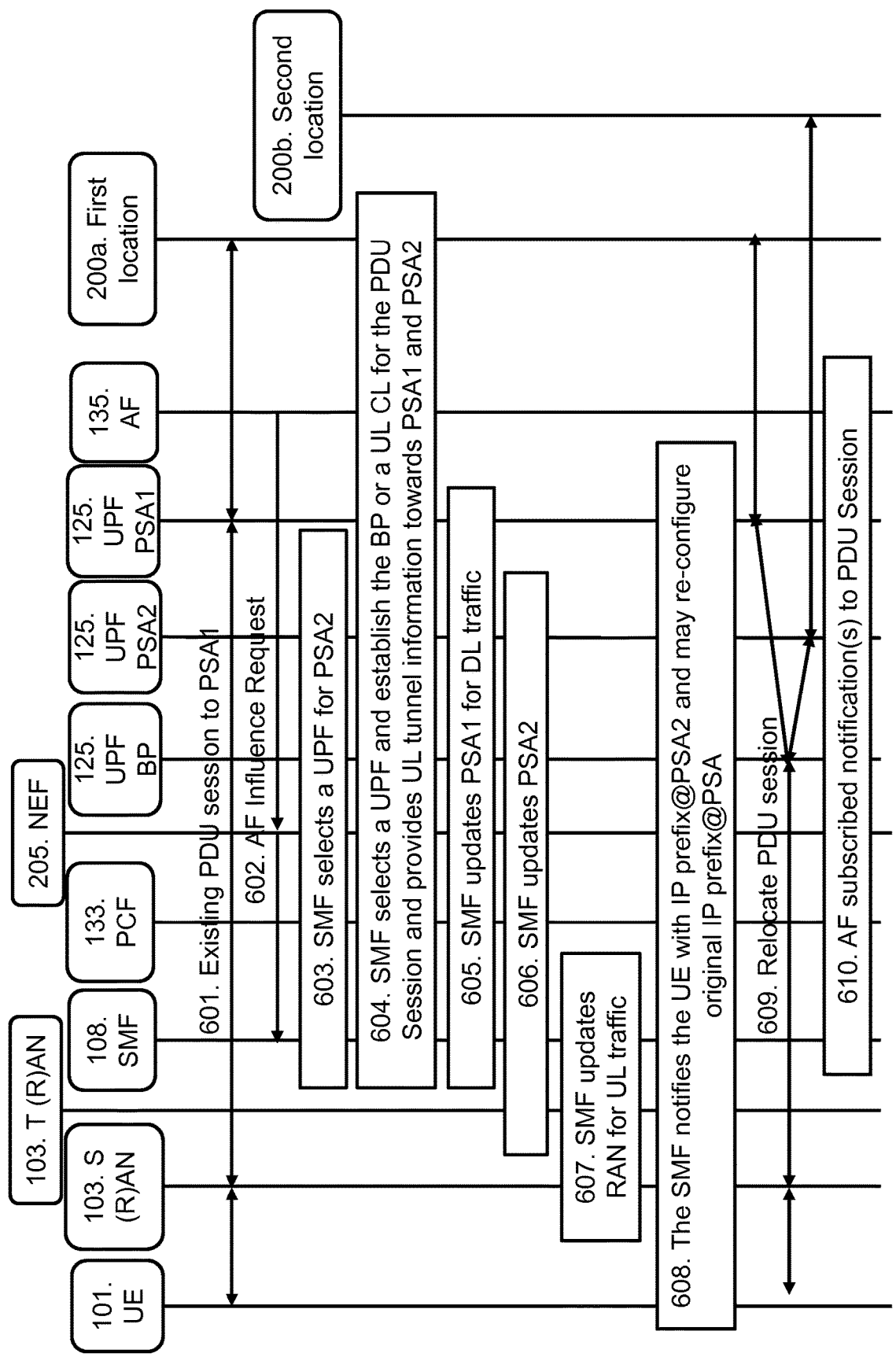
FIG. 6 is a signaling diagram illustrating an example method.

This step corresponds to steps 302, 303 and 304 in FIG. 3. The SMF 108 acts according to newly installed rules. For example, the SMF 108 may add a Local Breakout (LBO) PDU session, which is illustrated in FIG. 6.

Step 410

The SMF 108 stores the list of DNAI and the corresponding traffic routing information, in addition to the indication.

FIG. 5 is a signaling diagram illustrating an example of a method with dynamic rules for a UE 101 with an ongoing PDU session. The method comprises at least one of the following steps, which steps may be performed in any suitable order than described below:

Step 502

This step corresponds to step 402 in FIG. 4. The AF 135 decides to send requests to influence SMF steering decisions for traffic of a PDU Session.

Step 504

The AF 135 discovers a NEF 205. How to discover the NEF 205 may be configured in the AF 135.

Step 505

This step corresponds to step 301 in FIG. 3. The AF 135 sends a message to the NEF 205 which was discovered in step 504. The message may be an AF Traffic steering request. The message may comprise an AF transaction identifier. The NEF 205 receives the message from the AF 135.

Step 506

The NEF 205 performs information mapping. The mapping is between external parameters from the AF 135 to network internal parameter used by the PCF 133 and the SMF 108. Since the AF 135 may be a 3GPP it may not have access to 5G core network internal parameters.

Step 507

The NEF 205 discovers a PCF 133 that handles the ongoing PDU session. When comparing with FIG. 4, it is seen that a corresponding step is performed by the AF 135 in FIG. 4.

Step 508

This step corresponds to step 301 in FIG. 3. The NEF 205 sends a message to the PCF 133. The PCF 133 receives the message from the NEF 205. The message may be an AF Traffic steering request message. The message may comprise an AF transaction identifier. This step may be seen as forwarding the message from step 505. When comparing with FIG. 4, it is seen that a corresponding message is sent directly from the AF 135 to the PCF 133 in FIG. 4, while the message is sent via the NEF 205 in FIG. 5.

Step 509

This step corresponds to step 406 in FIG. 4. The PCF 133 takes a decision to update the SMF 108 with new policy rule(s).

Step 510

This step corresponds to step 301 in FIG. 3, and step 407 in FIG. 4. The PCF 133 sends a PDU session modification message to the SMF 108. The SMF 108 receives the message from the PCF 133. The rules from step 509 may be included in the message in step 510.

Step 511

This step corresponds to step 408 in FIG. 4. The SMF 108 sends a PDU session modification Ack message to the PCF 133. The Ack message is an acknowledgement of the message in step 307. The PCF 133 receives the message from the SMF 108.

Step 512

This step corresponds to steps 302-305 in FIG. 3 and step 409 in FIG. 4. The SMF 108 acts according to newly installed rules. For example, the SMF 108 may add a LBO PDU session, which is shown in FIG. 6.

Step 513

This step corresponds to step 410 in FIG. 4. The SMF 108 stores the list of DNAI and the corresponding traffic routing information, in addition to the indication.

FIG. 6 will now be described. This figure describes an example method where a LOB PDU session is added, i.e. the SMF 108 decides to establish new PDU Session anchor. In FIG. 6, the first location 200a may be a central service network which is identified with DNAI1. The second location 200b may be a local service network which is identified with DNAI2. The following three UPFs 125 are shown in FIG. 6: an UPF BP, a UPF PSA2 and a UPF PSA1. The method in FIG. 6 comprises at least one of the following steps, which step may be performed in any suitable order than described below:

Step 601

There is an existing PDU session between the UE 101 and the UPF PSA1 125. The session may involve the UE 101, a (R)AN 103, the UPF PSA1 and the first location 200a.

Step 602

This step corresponds to step 301 in FIG. 3, steps 405 and 407 in FIG. 4 and steps 505, 508 and 510 in FIG. 5. The AF 133 sends a message to the SMF 108. The message may be an AF Influence Request. The message may be sent via the NEF 205 or directly to the SMF 108. The message may comprise dynamic or pre-provisioned rules for an ongoing session. This may also be described as the AF 133 sending a list of DNAI and traffic routing information to the SMF 108. There may be an indication in the message that informs SMF 108 that it may change traffic routing information among these freely. The indication may be in the form of a flag.

Step 603

This step corresponds to steps 303 in FIG. 3, step 409 in FIG. 4 and step 512 in FIG. 5. The SMF 108 selects a UPF 125 for PSA2, i.e. for the second location 200b. The selection is based on the information from step 602.

Step 604

This step corresponds to step 303 in FIG. 3, step 409 in FIG. 4 and step 512 in FIG. 5. The SMF 108 selects an additional UPF 125 and establishes the BP or an Uplink (UL) Classifier (CL) for the PDU Session and provides UL tunnel information towards the UPF 125 acting as a PSA1 and the UPF 125 acting as the PSA2. The SMF 108 selects one APP location by applying the traffic routing information in the UPF 12. The SMF 108 stores the list of DNAIs and traffic routing information for future usage.

Step 605

This step corresponds to step 304 in FIG. 3, step 409 in FIG. 4 and step 512 in FIG. 5. The SMF 108 updates the PSA1 for DL traffic. It may also provide the BP or UL CL CN tunnel information for the downlink (DL) traffic.

Step 606

This step corresponds to step 304 in FIG. 3, step 409 in FIG. 4 and step 512 in FIG. 5. The SMF 108 updates the PSA2 providing the BP or UL CL CN tunnel information for DL traffic to the UPF PSA2 125.

Step 607

This step corresponds to step 304 in FIG. 3, step 409 in FIG. 4 and step 512 in FIG. 5. The SMF 108 updates the RAN for UL traffic, providing the new CN Tunnel information corresponding to the UPF.

Step 608

This step corresponds to step 409 in FIG. 4 and step 512 in FIG. 5. If multi-homing occurs, the SMF 108 notifies the UE 101 with the IP address prefix@PSA2 and may reconfigure the original IP address prefix@PSA1 using the IPv6 Router Advertisement.

Step 609

This step corresponds to step 409 in FIG. 4 and step 51222 in FIG. 5. The existing PDU session is steered, routed or relocated from involving the UE 101, the (R)AN 103, the UPF BP 125, the UPF PSA1 and the first location 200a to involving the UE 101, the (R)AN 103, the UPF BP 125, the UPF PSA2 and the second location 200b. Step 609 shows the resulting user plane i.e. the change from the user plane in step 601 due to the added UPFs 125. The first location 200a may be a central service network which is identified with a DNAI1 and the second location 200b may be a local service network and identified with a DNAI2.

Step 610

This step corresponds to step 409 in FIG. 4 and step 512 in FIG. 5. The SMF 108 sends a notification to the AF 133. The AF 133 receives the notification from the SMF 108. The notification may be an AF subscribed notification(s) to PDU Session.

Figure 7A:
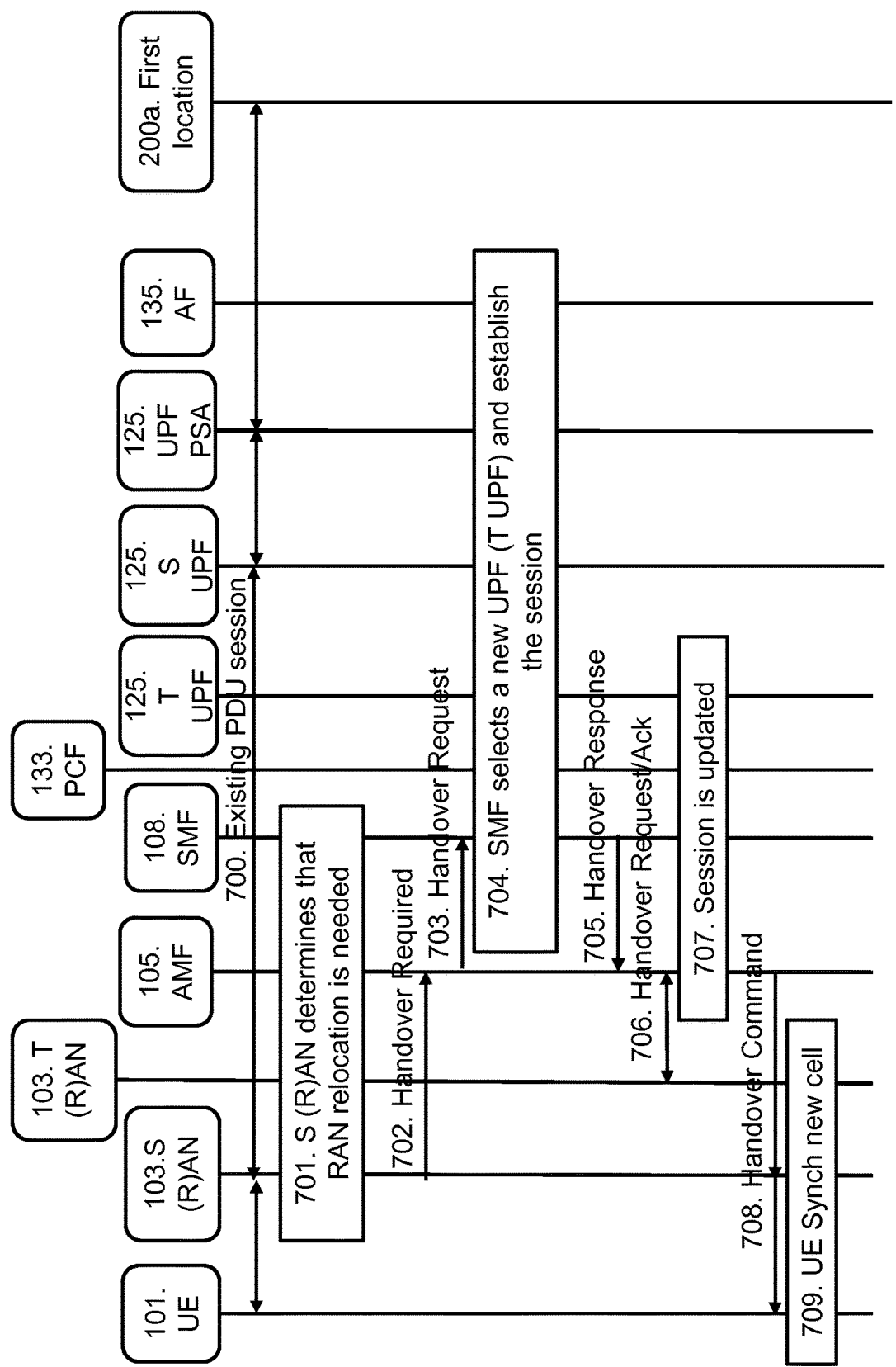
FIG. 7a is a signaling diagram illustrating an example method.
Figure 7B:
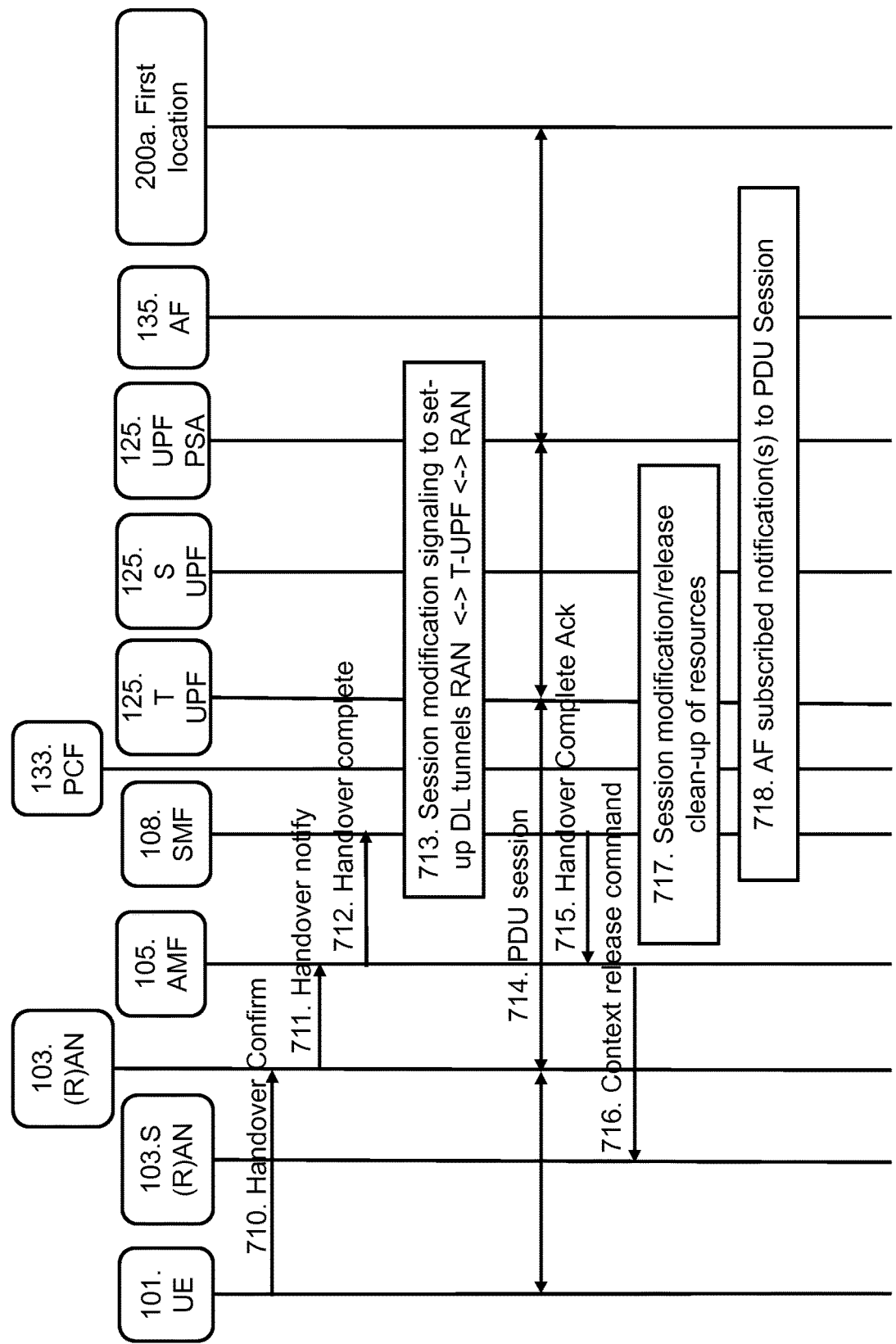
FIG. 7b is a signaling diagram illustrating an example method.

FIG. 7a and FIG. 7b will now be described. These figures describe an example method with a relocation of UPF and where the S (R)AN 103 triggers a handover to a T (R)AN 103. In FIGS. 7a and 7b, the first location 200a may be a local service network which is identified with DNAI1. The following three UPFs 125 are shown in FIGS. 7a and 7b: a Target UPF (T UPF), Source UPF (S UPF) and UPF PSA. The T UPF 125 is the new UPF the session moves to. The S UPF is the initial UPF 125. The UPF PSA is the UPF that act as the PDU Session Anchor. FIG. 7a comprises steps 700-709 and FIG. 7b comprises step 710-717. FIG. 7b is a continuation of FIG. 7a. The method in FIGS. 7a and 7b comprise at least one of the following steps, which step may be performed in any suitable order than described below:

Step 700

This step is seen in FIG. 7a. This step corresponds to step 601 in FIG. 6. There is an existing PDU session between the UE 101, the S UPF 125 and the UPF PSA1. The session may involve the UE 101, the S (R)AN 103, the S UPF 125, the UPF PSA1 and the first location 200a.

Step 701

This step is seen in FIG. 7a. The S (R)AN 103 determines that a RAN relocation is needed, i.e. a relocation from the S (R)AN 103 to the T (R)AN 103. S (R)AN 103 in FIG. 7 indicates Source RAN and in the first location 200a.

Step 702

This step is seen in FIG. 7a. When the decision is taken in step 701, the S (R)AN 103 sends a handover required message to the AMF 105. The AMF 105 receives the message from the S (R)AN 103.

Step 703

This step is seen in FIG. 7a. The AMF 105 sends a PDU handover request message to the SMF 108. The SMF 108 receives the message from the AMF 105.

Step 704

This step is seen in FIG. 7a. This step corresponds to step 302 and 303 in FIG. 3, step 409 in FIG. 4, step 512 in FIG. 5 and steps 603 and 604 in FIG. 6. The SMF 108 selects a new UPF 125, e.g. the T UPF 125, and establishes the session. At the same time, the SMF 108 can change the traffic routing information on the UPF 125 to steer the traffic to the most appropriate APP location. As long as the traffic routing information is in the list of DNAIs and traffic routing information previously received from AF 133.

Step 705

This step is seen in FIG. 7a. This step corresponds to step 304 in FIG. 3. The SMF 108 sends a PDU handover response message to the AMF 105. The AMF 105 receives the handover response message from the SMF 108. The handover response message is a response to the handover request message in step 703. The sending of the handover response message is triggered by step 704.

Step 706

This step is seen in FIG. 7a. The AMF 105 sends a handover request message to the T (R)AN 103. The T (R)AN 103 receives the handover request from the AMF 105. The ack message is an acknowledgement of the Handover Request.

Step 707

This step is seen in FIG. 7a. The PDU session is updated.

Step 708

This step is seen in FIG. 7a. The AMF 105 sends a handover command message to the UE 101. The message may be sent via the S (R)AN 103.

Step 709

This step is seen in FIG. 7a. The UE 101 synchronizes to the new radio cell which the UE 101 moves to and which is served by the T (R)AN 103.

Step 710

This step is seen in FIG. 7b. The UE 101 sends a handover confirm message to the T (R)AN 103.

Step 711

This step is seen in FIG. 7b. The T (R)AN 103 sends a handover notify message to the AMF 105. The AMF 105 receives the message from the T (R)AN 103.

Step 712

This step is seen in FIG. 7b. The AMF 105 sends a handover complete message to the SMF 108. The SMF 108 receives the message from the AMF 105.

Step 713

This step is seen in FIG. 7b. Session modification signaling is sent to set-up DL tunnels between the RAN 103, the T-UPF 125 and the RAN 103. The SMF 108, the T UPF 125 and the UPF PSA are involved in the signaling in step 713.

Step 714

This step is seen in FIG. 7b. The PDU session is now handed over to the (R)AN 103. The PDU session may now involve the UE 101, the (R)AN 103, the T UPF 125, the UPF PSA1 and the first location 200a.

Step 715

This step is seen in FIG. 7b. The SMF 108 sends a handover complete ack message to the AMF 105. This message is an acknowledgement of the message in step 712. The AMF 105 receives the message from the SMF 108.

Step 716

This step is seen in FIG. 7b. A context release command is sent from the AMF 105 to the S (R)AN 103. The S (R)AN 103 may now be referred to as an old RAN.

Step 717

This step is seen in FIG. 7b. The SMF 108 sends a session modification message to the S UPF 125. The S UPF 125 receives the message from the SMF 108. The purpose of the message is to release and clean-up resources associated with the PDU session when it involved the S (R)AN 103.

Step 718

This step is seen in FIG. 7b. The SMF 108 sends a notification to the AF 133. The notification may be referred to as AF subscribed notification(s) to PDU Session. This notification may lead to another AF rule update, informing that APP relocation was needed. The APP relocation is associated with a change of traffic routing information. Step 718 may only inform the AF 133 of the currently selected DNAI.

As mentioned earlier, there may be different examples of how the SMF 108 determines that it is allowed to steer the traffic to a selected one of the plurality of candidate locations 200a, 200b. Some such examples will now be described in more detail.

In another example, the SMF 108 is preconfigured by default to always be allowed to steer the traffic to a selected one of the plurality of candidate locations 200a, 200b. This means that the SMF 108 takes the decision in step 302 in FIG. 3 unless it has received instructions to the contrary. This may also be referred to as an absence of an indication may be interpreted by the SMF 108 as it is allowed.

In a further example, the SMF 108 determines that it is allowed to steer the traffic to a selected one of the plurality of candidate locations 200a, 200b upon reception of an indication. The presence of the indication may be interpreted by the SMF 108 to mean that it is allowed, or a certain value of the indication may interpreted by the SMF 108 to mean that it is allowed. For example, the value 100 is to be interpreted as allowed, and all other values are interpreted as not allowed. The indication may be in the form of a flag, where a 1 indicates allowed and 0 indicates not allowed.

Furthermore, the fact that the information about the candidate location comprises information about a plurality of locations may in itself be the basis for the decision taken by the SMF 108 to be allowed.

Other examples of when the SMF 108 is allowed may be that the re-establishment time is so fast that it is acceptable that the SMF 108 is allowed to steer traffic for the application 201 to a selected one of the plurality of locations. The Re-establishment time is the time to setup a new session.

In another example, an indication of that an APP 201 is stateless should lead the SMF 108 to determining that it is allowed. For example, APPs 201 such as web APPs are often stateless. When the state does not need to be preserved in the APP 201 it is not realistic that the SMF 108 cannot change traffic steering to reach another APP instance on its own, i.e. that SMF 108 must either ask for permission from the AF 135 in order to change the traffic steering or only change the UPF location and hope for the AF 135 to send new steering rules to reach another APP location. So for e.g. stateless APPs 201, the SMF 108 may be able to use the most appropriate traffic routing information to steer the traffic to the most appropriate APP location given by the DNAI, as given by e.g. UPF location and UE location. This means that the SMF 108 should be able to change, add and/or remove traffic routing information on a UPF 125 freely as long as the traffic routing information is among those given by the AF 133. In other words, the SMF 108 should be allowed to steer traffic for the APP 201 to a selected location which is the most appropriate location. Local UPFs 125 without or with unused traffic routing information may be cleaned from the UP path without negotiation with the AF 133. Notifications to AF 133 after the relocation may still be needed. As mentioned earlier, a problem has been to know when the SMF 108 can change, add, and/or remove the traffic routing information on a UPF 125 to steer the traffic to the most appropriate APP location, and when there is a need for AF preparations prior to relocation of APP 201. The AF preparation is required in existing solution in 3GPP for stateful APPs 201. The AF preparation could include copying of state from one source APP 201 to a target APP 201. However, stateless APPs 201 are only examples where the SMF 108 may be allowed to steer the traffic to a selected one of a plurality of applications.

The AF 135 has APP related information, for example, the AF 135 knows if an APP 201 is stateful or stateless. This information be known to AF 135 by configuration or dynamically provisioned by the APPs 201 themselves.

When the AF 135 sends a message to the PCF 133, such as for example an AF influence request message, it may include in addition to a list of locations 200a, 200b where the APP 201 is located, and traffic routing information on how to reach the APP 201 from the UPF 236, an indication to inform SMF 108 if the APP 201 is considered stateless. The list of locations 200 may be in the form of a list of DNAIs, and the traffic routing information may be N6 routing information. The indication may be in the form of a flag. This indication will enable the SMF 108 to change traffic routing information on the UPF 135 freely in order to steer to the most appropriate APP location, i.e. given UPF location and UE location, as long as the APP location is among those given by the AF 135. This will reduce signaling needs and speed up the relocation of the APP 201. The indication also enables the SMF 108 to remove unused user plane path immediately without negotiation with AF 135. At absence of this indication the SMF 108 may use legacy methods to either ask the AF 135 for permission to change the traffic routing information or only relocate the UPF 125 and await an AF triggered APP relocation.

There may, in some examples, be different categories or degrees of stateless. Some categories or degrees may indicate that the SMF 108 is allowed, and others may indicate that it is not allowed. E.g. the protocol may convey state data that can be used by the APP 201 or that the APP locations 200a, 200b may use a common back-end database to store state data.

Figure 8:
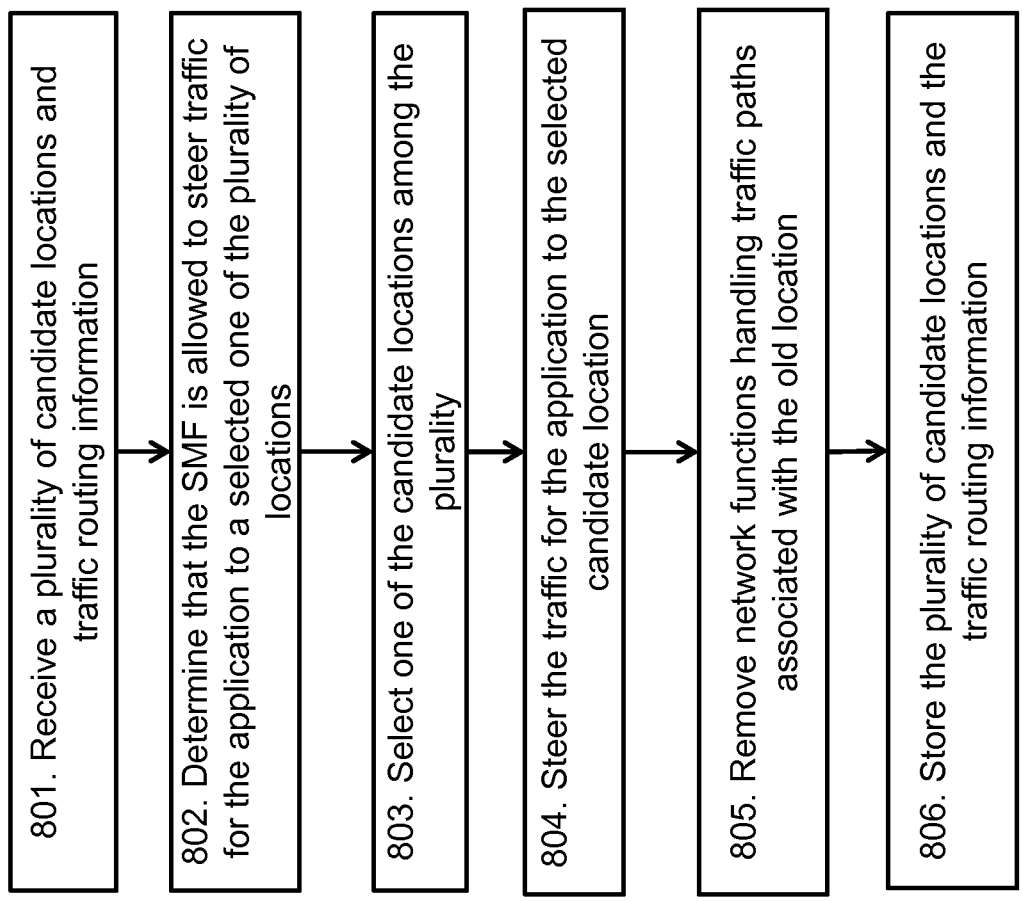
FIG. 8 is a flow chart illustrating an example of a method performed by a SMF.

The method described above will now be described seen from the perspective of SMF 108. FIG. 8 is a flowchart describing the present method performed by the SMF 108 for handling traffic for an application 201. The method comprises at least one of the following steps to be performed by the SMF 108, which steps may be performed in any suitable order than described below:

Step 801

This step may correspond to for example step 301 in FIG. 3, steps 405 and 407 in FIG. 4, steps 505, 508 and 510 in FIG. 5 and step 602 in FIG. 6. The SMF 108, receives, from an AF 135, a plurality of candidate locations 200a, 200b for the application 201 and traffic routing information for the application 201 for each of the plurality of locations 200a, 200b.

The plurality of candidate locations 200a, 200b may be in form of a list of DNAI, and the corresponding traffic routing information may be N6 traffic routing information. The traffic routing information may indicate how to reach the application 201 from a UPF 125 at the location.

The plurality of candidate locations 200a, 200b and the traffic routing information may be received from the AF 125 via at least one of: a PCF 133 and a NEF 205. An indication may also be received from the AF 125 via at least one of the PCF 133 and the NEF 205.

Step 802

This step may correspond to for example step 302 in FIG. 3, step 409 in FIG. 4, step 512 in FIG. 5, steps 603 and 604 in FIG. 6 and step 704 in FIG. 7. The SMF 108 determines that the SMF 108 is allowed to steer traffic for the application 201 to a selected one of the plurality of locations.

The decision may be taken when no indication to the contrary has been received. The decision may be taken when an indication of that the SMF 108 is allowed to steer traffic has been received from the AF 135. The indication may indicate that the application 201 is stateless, and a stateless application 201 may allow the SMF 108 to steer traffic for the application 201 to the selected location 200a, 200b. The indication may be sent when a UE 101 which currently uses the application 201 has moved from one position to another position, or from one location to another location.

The plurality of candidate locations 200a, 200b, traffic routing information and the indication may be received together in one message.

Step 803

This step may correspond to for example step 303 in FIG. 3, step 409 in FIG. 4, step 512 in FIG. 5, steps 603 and 604 in FIG. 6 and step 704 in FIG. 7. The SMF 108 selects one of the candidate locations 200a, 200b among the plurality 200a, 200b received from the AF 135.

The selection may be an initial selection and the steering may be to the initial selected location, or the selection may be a reselection and the steering may be to the reselected location. Where the reselection and the steering to a reselected location may be described as a relocation.

Step 804

This step may correspond to for example step 304 in FIG. 3, step 409 in FIG. 4, step 512 in FIG. 5 and step 609 in FIG. 6. The SMF 108 steers the traffic for the application 201 to the selected candidate location 200a, 200b. Based on step 801, this may be referred to as an AF influenced traffic steering. The SMF 108 may use location information in the form of DNAI and traffic routing information to achieve the steering.

Step 805

This step may correspond to for example step 717 in FIG. 7. The SMF 108 may remove network functions handling traffic paths associated with the old location 200a after the traffic steering has been performed. The old location 200a refers to the location in a case where the traffic for the application was steered in step 804 from one location to the selected candidate location. The location which the traffic was steered from may be referred to as the old location, and the selected candidate location may be referred to as a new location.

Step 806

This step may correspond to for example step 410 in FIG. 4 and step 513 in FIG. 5. The SMF 108 may store the plurality of candidate locations 200a, 200b and the traffic routing information when the determining has been performed. In some embodiments, the storing may be performed when an indication has been received.

Figure 9:
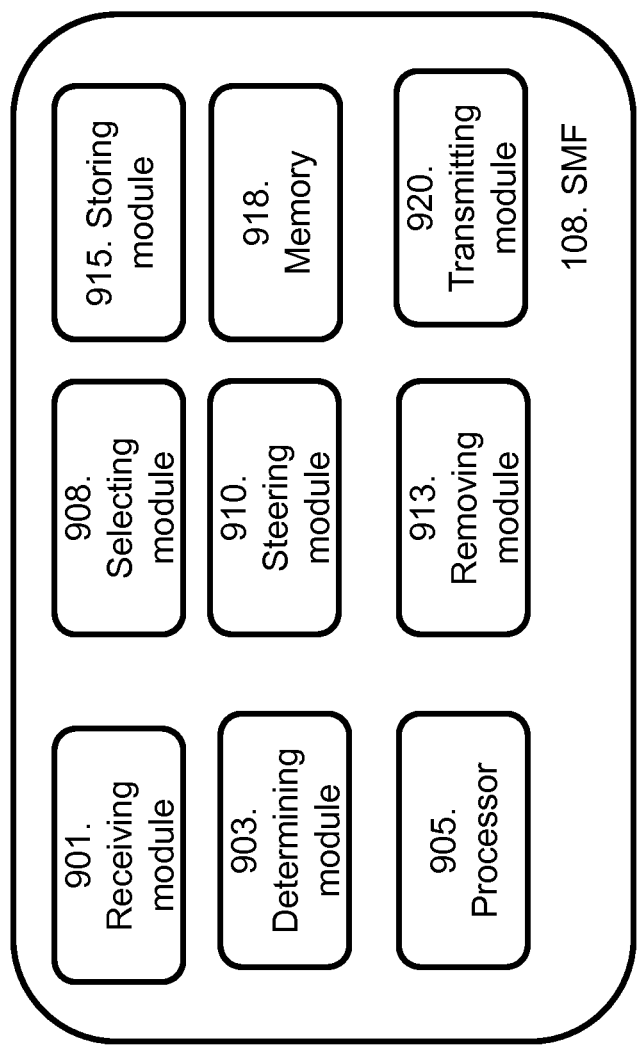
FIG. 9 is a schematic block diagram illustrating an embodiment of a SMF.

To perform the method steps shown in FIG. 8 for handling traffic for an application, the SMF may comprise an arrangement as shown in FIG. 9.

The SMF 108 is adapted to, e.g. by means of a receiving module 901, receive, from an AF 135, a plurality of candidate locations 200a, 200b for the application 201 and traffic routing information for the application 201 for each of the plurality of locations 200a, 200b. The plurality of candidate locations 200a, 200b, traffic routing information and possibly also an indication may be received together in one message. The plurality of candidate locations 200a, 200b may be in form of a list of DNAI, and the corresponding traffic routing information may be N6 traffic routing information. The traffic routing information may indicate how to reach the application 201 from a UPF 125 at the location. The plurality of candidate locations 200a, 200b and the traffic routing information and possibly also the indication may be received from the AF 125 via at least one of: a PCF 133 and a NEF 205. The receiving module 901 may also be referred to as a receiving unit, a receiving means, a receiving circuit, means for receiving, input unit etc. The receiving module 01 may be a receiver, a transceiver etc. The receiving module 901 may be a wireless receiver of the SMF 108 of a wireless or fixed communications system.

The SMF 108 is adapted to, e.g. by means of a determining module 903, determine that the SMF 108 is allowed to steer traffic for the application 201 to a selected one of the plurality of locations. The decision may be taken when no indication to the contrary has been received. The decision may be taken when an indication of that the SMF 108 is allowed to steer traffic has been received from the AF 135. The indication may indicate that the application 201 is stateless, and a stateless application 201 may allow the SMF 108 to steer traffic for the application 201. The indication may be received when a UE 101 which currently uses the application 201 has moved. The determining module 903 may also be referred to as a determining unit, a determining means, a determining circuit, means for determining etc. The determining module 903 may be a processor 905 of the SMF 108 or comprised in the processor 905 of the SMF 108.

The SMF 108 is adapted to, e.g. by means of a selecting module 908, select one of the candidate locations 200a, 200b among the plurality 200a, 200b received from the AF 135. The selection may be an initial selection and the steering may be to the initial selected location, or the selection may be a reselection and the steering may be to the reselected location. The selecting module 908 may also be referred to as a selecting unit, a selecting means, a selecting circuit, means for selecting etc. The selecting module 908 may be the processor 905 of the SMF 108 or comprised in the processor 905 of the SMF 108.

The SMF 108 is adapted to, e.g. by means of a steering module 910, steer the traffic for the application 201 to the selected candidate location 200a, 200b. The steering module 910 may also be referred to as a steering unit, a steering means, a steering circuit, means for steering etc. The steering module 910 may be the processor 905 of the SMF 108 or comprised in the processor 905 of the SMF 108.

The SMF 108 may be adapted to, e.g. by means of a removing module 913, remove network functions handling traffic paths associated with the old location 200a after the traffic steering has been performed. The removing module 913 may also be referred to as a removing unit, a removing means, a removing circuit, means for removing etc. The removing module 913 may be the processor 905 of the SMF 108 or comprised in the processor 905 of the SMF 108.

The SMF 108 may be adapted to, e.g. by means of a storing module 915, store the plurality of candidate locations 200a, 200b and the traffic routing information when the decision has been taken. The storing module 915 may also be referred to as a storing unit, a storing means, a storing circuit, means for storing etc. The storing module 915 may be the processor 905 of the SMF 108 or comprised in the processor 905 of the SMF 108. The storing module 915 may store the plurality of candidate locations 200a, 200b and the traffic routing information in a memory 918 of the SMF 108.

The SMF 108 may comprises a transmitting module 920 which is adapted to transmit information to other entities, such as e.g. the AF 135, the PCF 133, the UPF 125 etc. The transmitting module 920 may also be referred to as a transmitting unit, a transmitting means, a transmitting circuit, means for transmitting, output unit etc. The transmitting module 20 may be a transmitter, a transceiver etc. The transmitting module 920 may be a wireless transmitter of the SMF 108 of a wireless or fixed communications system.

The memory 918 comprises instructions executable by the processor 905. The memory 918 comprises one or more memory units. The memory 918 is arranged to be used to store data, received data streams, information, location information, traffic routing information, indications, messages, lists, threshold values, time periods, configurations, schedulings, and applications to perform the methods herein when being executed in the SMF 108.

In some embodiments, a computer program may comprise instructions which, when executed on at least one processor, cause the at least one processor to carry out at least the method steps 801-806. A carrier may comprise the computer program, and the carrier is one of an electronic signal, optical signal, radio signal or computer readable storage medium.

Those skilled in the art will also appreciate that the receiving module 901, the determining module 903, the selecting module 908, the steering module 910, the removing module 913, the storing module 915 and the transmitting module 920 described above may refer to a combination of analog and digital circuits, and/or one or more processors configured with software and/or firmware, e.g. stored in the memory 918, that when executed by the one or more processors such as the processor 905 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present mechanism for handling traffic for an application 201 may be implemented through one or more processors, such as the processor 905 in the SMF arrangement depicted in FIG. 9 together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the SMF 108. One such carrier may be in the form of a CD ROM disc. It is however feasible with other data carriers such as a memory stick. The computer program code can furthermore be provided as pure program code on a server and downloaded to the SMF 108.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method, performed by a Session Management Function (SMF), for handling traffic for an application, the method comprising:
   receiving, from an Application Function (AF), a plurality of candidate locations for the application, and traffic routing information for the application for each of the plurality of candidate locations, wherein traffic for the application is initially steered to an initially selected candidate location;
   determining, when no indication to the contrary has been received and based on the application being stateless, that the SMF is allowed to steer traffic for the application to a selected one of the plurality of candidate locations;
   reselecting one of the candidate locations from among the plurality of candidate locations received from the AF; and
   steering the traffic for the application to the reselected candidate location by steering the traffic from the initially selected candidate to the reselected candidate location.

2. The method of claim 1, wherein determining that the SMF is allowed to steer the traffic occurs when an indication that the SMF is allowed to steer traffic has been received from the AF.

3. The method of claim 2, wherein the indication indicates that the application is stateless, and wherein a stateless application allows the SMF to steer traffic for the application to the selected one of the plurality of candidate locations.

4. The method of claim 2, wherein the plurality of candidate locations, traffic routing information, and the indication are received together in one message.

5. The method of claim 1, further comprising removing network functions handling traffic paths associated with an old location after the steering the traffic has been performed.

6. The method of claim 1, further comprising storing the plurality of candidate locations and the traffic routing information when the determining has been performed.

7. The method of claim 1, wherein the plurality of candidate locations is in form of a list of Data Network Access Identifiers (DNAI), and the corresponding traffic routing information is N6 traffic routing information.

8. The method of claim 1, wherein the traffic routing information indicates how to reach the application from a User Plane Function (UPF) at the corresponding location.

9. A Session Management Function (SMF) for handling traffic for an application, the SMF comprising:
   processing circuitry;
   memory containing instructions executable by the processing circuitry whereby the SMF is operative to:
      receive, from an Application Function (AF), a plurality of candidate locations for the application, and traffic routing information for the application for each of the plurality of candidate locations, wherein traffic for the application is initially steered to an initially selected candidate location;
      determine, when no indication to the contrary has been received and based on the application being stateless, that the SMF is allowed to steer traffic for the application to a selected one of the plurality of candidate locations;
      reselect one of the candidate locations from among the plurality of candidate locations received from the AF; and steer the traffic for the application to the reselected candidate location by steering the traffic from the initially selected candidate location to the reselected candidate location.

10. The SMF of claim 9, whereby the SMF is further operative to determine that the SMF is allowed to steer the traffic when an indication of that the SMF is allowed to steer traffic has been received from the AF.

11. The SMF of claim 10, wherein the indication indicates that the application is stateless, and wherein a stateless application allows the SMF to relocate traffic for the application to the selected one of the plurality of candidate locations.

12. The SMF of claim 10, wherein the plurality of candidate locations, traffic routing information, and the indication are received together in one message.

13. The SMF of claim 9, wherein the instructions are such that the SMF is operative to remove network functions handling traffic paths associated with an old location after the steering the traffic has been performed.

14. The SMF of claim 9, wherein the instructions are such that the SMF is operative to store the plurality of candidate locations and the traffic routing information when the determining has been performed.

15. The SMF of claim 9, wherein the plurality of candidate locations is in form of a list of Data Network Access Identifiers (DNAI), and the corresponding traffic routing information is N6 traffic routing information.

16. The SMF of claim 9, wherein the traffic routing information indicates how to reach the application from a User Plane Function (UPF) at the corresponding location.

* * * * *